March 10, 1942.   V. H. BODLE   2,275,603
PERFORATING METHOD AND APPARATUS
Filed May 6, 1940   2 Sheets-Sheet 1
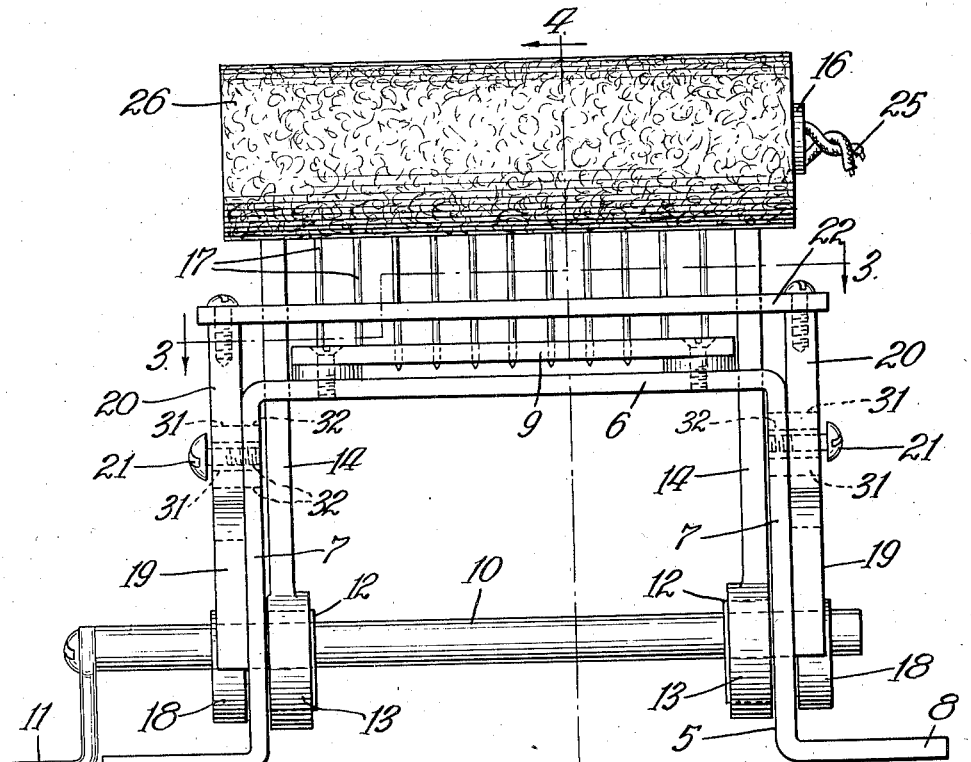
Fig. 1.
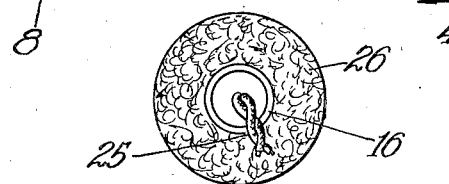
Fig. 2.
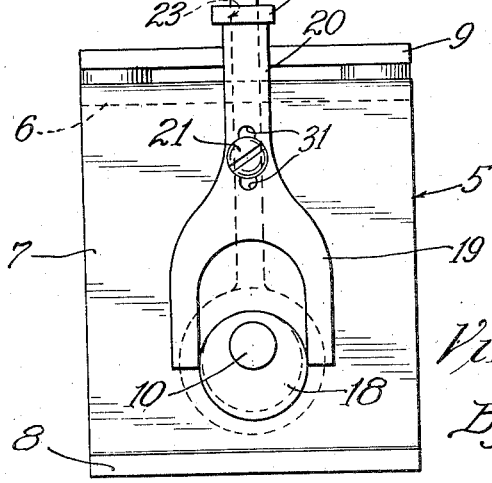
Inventor:
Virgil H. Bodle
By Eugene M. Giles
Atty.

March 10, 1942.　　　V. H. BODLE　　　2,275,603
PERFORATING METHOD AND APPARATUS
Filed May 6, 1940　　　2 Sheets-Sheet 2

Inventor
Virgil H. Bodle
By Eugene M. Giles
Atty.

Patented Mar. 10, 1942

2,275,603

UNITED STATES PATENT OFFICE 2,275,603

PERFORATING METHOD AND APPARATUS

Virgil H. Bodle, Mishawaka, Ind., assignor to Mishawaka Rubber and Woolen Manufacturing Company, Mishawaka, Ind., a corporation of Indiana Application May 6, 1940, Serial No. 333,531

6 Claims. (Cl. 164—90)

My invention relates to the perforating of sheet materials composed partly or wholly of rubber or the like, and has reference more particularly to a method of and machine for puncturing with localized heat at each puncture place and advancing the material by the puncturing members. The general purpose of my invention is similar to that of the application Serial No. 323,313 filed by Frank Jermain Chandler on March 11, 1940.

My invention contemplates a machine adapted for use in perforating sheet rubber, rubber coated fabrics, laminated rubber and fabric sheets or other similar materials to provide small openings therethrough for ventilation or "breathing" as it is commonly called, and comprises a plurality of pins adapted to piece the material to form the perforations therein. A heater is provided to heat the pins which are operated so that after each perforating operation they remain in engagement with the material for a predetermined time interval whereby the side walls of the perforations formed in the material are heat treated by the pins so that the perforations do not close after the pins are removed therefrom. Also, the pins are arranged to have a movement while in engagement with the material to advance the material to the next operating position and through a distance equal to the selected distance between perforations. A stripper plate cooperates with the pins to strip the fabric from the pins as the latter are withdrawn from the fabric.

The principal objects of my invention are to provide a simple and convenient machine for producing numerous small perforations through sheet materials composed partly or wholly of rubber; to utilize the perforating members to impart advancing movement to the material; to prolong the time of engagement of the perforating members with the material; to avoid mutilation of the perforations; and to permit perforation of short pieces of material; these and other objects being accomplished as pointed out hereinafter and as shown in the accompanying drawings, in which:

Fig. 1 is a front view of a perforating machine constructed according to my invention;

Fig. 2 is an end view thereof;

Figure 3:
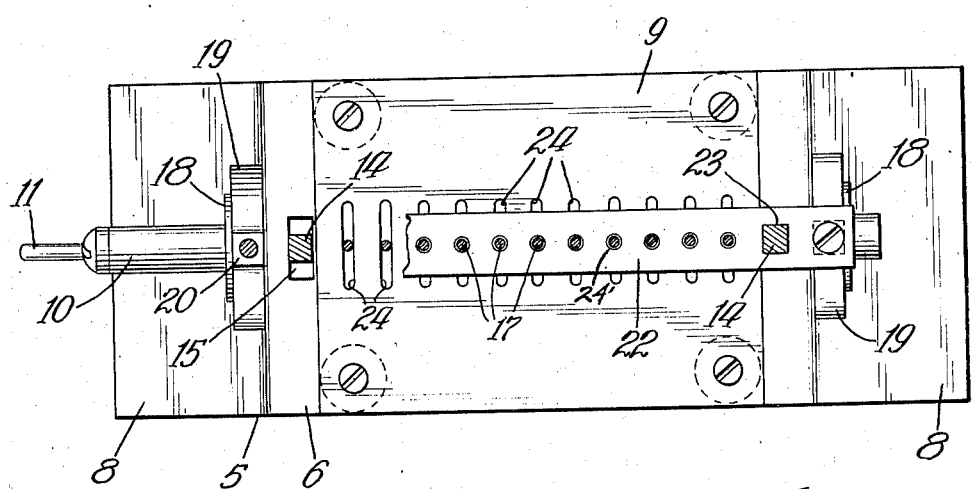
Fig. 3 is a horizontal section taken on line 3—3 of Fig. 1.

Referring to the drawings, the reference numeral 5 indicates the machine frame which, in the illustrated structure, comprises an elongated plate bent to provide a top 6 with end standards 7 having foot portions 8. Secured to the top 6 is a work supporting plate 9 upon which the work is supported during the perforation thereof and across which it is advanced by the perforating members.

A shaft 10 is journaled in the standards 7 to rotate and may be provided with a crank 11 or any other desired means for imparting rotation thereto, preferably some source of motive power being employed which rotates the shaft at a constant speed and at the appropriate rate of speed to insure engagement of the perforating members with the work the required length of time to insure permanence of perforations.

A pair of correspondingly arranged eccentrics 12 are secured to the shaft 10 at the inner sides respectively of the standards 7 and each eccentric is embraced by an eccentric strap 13 which has an arm 14 extending upwardly therefrom through a slot 15 in the corresponding end of the frame top 6. Secured to the upper ends of these arms 14 is a support 16 to which a series of pointed perforating pins 17 is secured in spaced relation so as to extend downwardly therefrom an equal distance, and it will be understood that rotation of the shaft 10 and the eccentrics 12 thereon will cause up and down reciprocation of the support 16 and its attached pins 17.

Secured on the shaft 10 is another pair of correspondingly arranged eccentric cams 18 located at the outer sides respectively of the frame standards 7 and each cam 18 engages in the forked lower end 19 of a rocker arm 20 which is pivoted at 21 on the outer side of the respective frame standard 7. The upper ends of these rocker arms 20 are connected by a stripper plate 22 which is located a sufficient distance above the work supporting plate 9 to afford ample space for passage of the work therebetween and it will be understood that in the rotation of the shaft 10, the cams 18 by their rotation in the forked ends of the arms 20 cause the stripper plate 22 to rock back and forth a selected distance over the work supporting plate 6.

The vertically reciprocable arms 14 which support the pin carrier are slidably engaged through openings 23 of the stripper plate 22 and by reason thereof the back and forth movement of the stripper plate 22 imparts a corresponding back and forth movement to the pin assembly supporting arms 14, and this assembly of pin carrier 16 and pins 17 not only reciprocate upwardly and downwardly by reason of the eccentric cams 12 but rocks back and forth with the stripper plate 22. It will be understood that the slots 15 of the frame top 6 are of ample length to permit the swinging movement of the arms 14 occasioned by the engagement of these arms through the swinging stripper plate 22 and moreover since the arms 14 swing on a changing center (the eccentrics 12) below the pivots 21 of the arms 20 it will be understood that there occurs a slight angular movement of the arms 14 in the openings 23 and these openings are accordingly made sufficiently large or the front and rear walls suitably shaped to permit this slight angular movement to occur freely without cramping.

The stripper plate 22 has, in line with the pins 17, apertures 24' through which the pins 17 extend, these apertures being sufficiently larger than the pins to permit the latter to reciprocate freely therein, and the arrangement of the pins 17 is such that in the fully elevated position thereof the ends of the pins 17 remain fully engaged in the apertures 24'. In the downward movement of the pins 17 they penetrate completely through the work on the work support 9 which has openings 24 therethrough to accommodate the ends of the pins 17 therein as shown in Fig. 4 when these pins are in the lowermost position, and these openings 24, as shown in Figs. 3 and 4, are in the form of elongated slots of ample length to permit the front to rear reciprocating movement that is imparted to the group of pins by the cams 18.

This device, as above indicated, is intended for perforating sheet material made entirely or partly of rubber and it is customary to perforate the material while the rubber is in the uncured state after which it is cut into the required sizes and shapes and assembled or otherwise prepared for its intended use and then cured.

To facilitate penetration of the pins through the rubber material and to give sufficient permanence to the perforations so they will be preserved unimpaired in the subsequent operations of processing the material, the pins 17 are heated, and for this purpose the pin carrier 16 contains an electrical heating element (not shown) to which current is supplied through flexible conductors 25 which are sufficiently free and flexible to permit the movements imparted to the pin carrier 16 by the cams 12 and 18. Also the carrier 16 is preferably enclosed in insulation 26 to prevent wastage or dissipation of heat.

Figure 4:
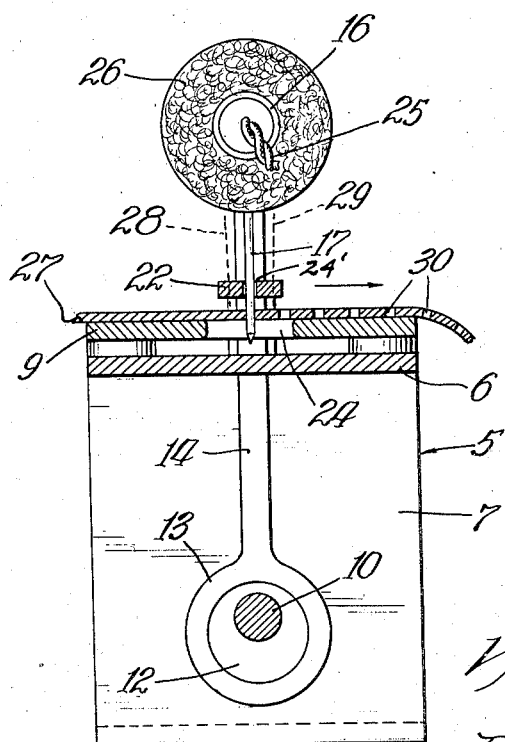
Fig. 4 is a vertical section taken on line 4—4 of Fig. 1.

In the operation of this device, the sheet material to be perforated which is indicated at 27 in Fig. 4, is started under the stripper plate 22 so that the pins 17 can engage same, and as the shaft 10 rotates, the pins 17 are lifted by the cams 12 and while upraised are swung by the cams 18 to the forward position represented by the dotted line 28 of Fig. 4 and as the pins near this position they begin to move downwardly under the influence of the cams 12 and penetrate through the material 27 whereupon the pins, while engaged with the work, are swung rearwardly by the cams 18 to the position represented by the dotted line 29, thereby advancing the work to the position preparatory to the next perforating operation. As the pins 17 near the position 29 they move upwardly so that at the position 29 they are withdrawn from the work and after such withdrawal are swung forwardly again by the cams 18 to the position 28 to repeat the perforating and advance of the material 27. Thus successive rows of perforations 30 are formed through the material 27, these rows being spaced apart the distance that the material is advanced by the rearward swinging of the pins 17 during the time the pins are engaged with the work.

Thus the pins, while engaged with the work are in motion first downwardly and then upwardly, this movement being beneficial as it tends to apply the needle heat more effectively to the perforations. Moreover by advancing the work by the swinging of the penetrated needles a greater duration of penetration results without the delay that would be occasioned by alternately perforating and advancing the work. The current supply to the heating element in the pin carrier 16 is controlled in any well known manner to maintain the needles 17 at a suitable temperature to cause an incipient localized vulcanization of the rubber around the perforations 30 during the time that the needles are engaged therein and thus the perforations are given a permanence so that in the subsequent handling and processing the perforations remain intact and are safely preserved against mutilation. Also it will be understood that the heat of the needles because of its softening effect, causes the needles to penetrate the rubber more readily and to be withdrawn freely from the material.

Oftentimes it is desirable to perforate a rubber sheet or a rubber coated material in which the surface of the rubber is embossed and in view of the uncured condition of the rubber it is important to accomplish the perforating without any contact with the embossed surface, as for example by the usual feed rolls, which would tend to mutilate or mar the embossing. This device is especially advantageous for this purpose as the performance of the advancing movement of the material by the perforating pins 17, while positive, avoids the necessity of using feed rolls and there is no contact with the upper surface of the work which might in any respect impair or mutilate any embossing on that surface. Moreover, since the material rests lightly on the work supporting plate 9 without any pressure thereagainst, even an embossing on the under surface of the material would be unlikely to be affected by the light contact therewith.

It will be understood from the above that the spacing of the rows of perforations 30 is determined by the extent of swinging movement imparted to the needles 17 by the cams 18 and that by varying the extent of such swinging movement a greater or less distance may be provided between the rows of perforations. This variation of swinging movement of the needles and spacing of the rows of perforations 30 may be accomplished by merely changing the elevation of the pivots 21 of the rocker arms 20 in any convenient manner, and for this purpose the rocker arms 20 may be provided with a vertical series of pivot openings 31 and the frame standards 7 with a corresponding series of threaded openings 32 in which the pins 21 may be optionally secured. Thus by changing the pins 21 from their present openings 31 and 32 to the top openings 31 and 32 a lesser amount of swinging movement of the needles 17 and closer spacing of the rows of perforations 30 is obtained, and by changing the pins 21 to the bottom openings 31 and 32 a greater swinging movement and wider perforation spacing is obtained.

While I have shown and described my invention in a preferred form, I am aware that various changes and modifications may be made therein without departing from the spirit of my invention, the scope of which is to be determined by the appended claims.

I claim as my invention:

1. In a perforating device of the class described, the combination of a work support, a group of pins relatively movable to and from the work support to perforate material thereon, means operable to move the pins crosswise of the work support to advance the work thereon for successive rows of perforations, said work support having openings into which the pins project and along which they are movable in the work advancing movement, and means for heating the pins.

2. In a perforating device of the class described, the combination of a work support, a group of pins reciprocable to and from the work support to perforate material thereon, means operable to move the pins crosswise of the work support to advance the work thereon for successive rows of perforations, said work support having openings into which the pins project and along which they are movable in the work advancing movement, a stripper plate through which the pins reciprocably project, and means for heating the pins.

3. In a perforating device of the class described, the combination of a work support, a group of pins reciprocable to and from the work support to perforate material thereon, means operable to move the pins crosswise of the work support to advance the work thereon for successive rows of perforations, said work support having openings into which the pins project and along which they are movable in the work advancing movement, a stripper plate movable with the pins crosswise of the work support and having said pins reciprocably projecting therethrough, and means for heating the pins.

4. In a perforating device of the class described, the combination of a main frame having a work support at the top thereof, a stripper plate above said work support, means pivoted on the main frame and supporting said stripper plate for oscillation relative to the work support, a pin supporting frame including downwardly extending supporting arms slidably reciprocable with respect to said stripper plate and having pins which project through the stripper plate and are reciprocable to and from the work support, a shaft rotatably mounted in the main frame under the work support and having a pair of eccentric members thereon engaged respectively by the stripper plate supporting means and the pin frame supporting arms, one of said eccentric members being operable to oscillate the stripper plate while the other eccentric member reciprocates the pin supporting frame.

5. In a perforating device of the class described, the combination of a main frame having a work support at the top thereof, a stripper plate above said work support, a rocker arm pivoted on the main frame and supporting said stripper plate for oscillation relative to the work support, a pin supporting frame including downwardly extending arms slidably reciprocable through said stripper plate, pins carried by said supporting frame and projecting through the stripper plate and reciprocable to and from the work support, a shaft rotatably mounted in the main frame under the work support and having a pair of eccentric members thereon engaged respectively by said rocker arm and said pin frame supporting arms, one of said eccentric members being operable to actuate the rocker arm and oscillate the stripper plate while the other eccentric member reciprocates the pin supporting frame.

6. In a perforating device of the class described, the combination of a work support, a group of pins relatively movable to and from the work support to perforate material thereon, means for heating said pins, and means to move the pins crosswise of the work support while in contact with the work and while the same is being advanced, whereby contact of the heated pins with the work is prolonged for effecting a heat treatment of the work adjacent the perforations made by said pins.

VIRGIL H. BODLE.